(12) United States Patent
Rotenberg et al.

(10) Patent No.: US 8,845,155 B2
(45) Date of Patent: Sep. 30, 2014

(54) TRAILER ADAPTER WITH LIGHT

(75) Inventors: Gregory Rotenberg, Highland Hts., OH (US); Jerry Corless, Streetsboro, OH (US)

(73) Assignee: Cequent Consumer Products, Inc., Solon, OH (US)

( * ) Notice: Subject to any disclaimer, the term of this patent is extended or adjusted under 35 U.S.C. 154(b) by 172 days.

(21) Appl. No.: 13/525,833

(22) Filed: Jun. 18, 2012

(65) Prior Publication Data

US 2013/0335988 A1 Dec. 19, 2013

(51) Int. Cl.
  *B60Q 1/22* (2006.01)
  *B60Q 1/24* (2006.01)
  *B60D 1/62* (2006.01)

(52) U.S. Cl.
  CPC ........................................ *B60D 1/62* (2013.01)
  USPC ............. 362/485; 439/35; 439/490; 307/10.8

(58) Field of Classification Search
  CPC .............. B60D 1/62; B60D 1/64; B60D 1/36; B60D 1/075; B60D 1/143; B60D 1/01; B60Q 1/305; B60Q 11/007; B60Q 1/32; B60Q 1/38; B60Q 1/30; B60Q 1/26; B60Q 1/2661; B60Q 7/02; G01R 31/006
  USPC ...................... 362/485; 439/35, 490; 307/10.8
  See application file for complete search history.

(56) References Cited

U.S. PATENT DOCUMENTS

| | | | |
|---|---|---|---|
| 4,781,393 A * | 11/1988 | Jeter | 307/10.1 |
| 5,080,594 A | 1/1992 | Swinford | |
| D342,937 S | 1/1994 | Angel et al. | |
| 5,320,560 A * | 6/1994 | Fladung | 439/490 |
| 5,354,204 A | 10/1994 | Hughes | |
| 5,443,389 A | 8/1995 | Hughes | |
| D370,204 S | 5/1996 | Kittridge | |
| 5,514,009 A | 5/1996 | Hughes | |
| 5,686,701 A | 11/1997 | Fukushima et al. | |
| 5,760,545 A * | 6/1998 | Mikel | 315/77 |
| 5,766,020 A | 6/1998 | Hughes | |
| D409,125 S | 5/1999 | Wang | |
| D420,977 S | 2/2000 | Lohrding | |
| 6,080,014 A | 6/2000 | Steiler | |
| 6,232,722 B1 | 5/2001 | Bryant et al. | |
| 6,259,170 B1 * | 7/2001 | Limoge et al. | 307/10.8 |
| 6,305,945 B1 | 10/2001 | Vance | |
| 6,390,824 B1 | 5/2002 | Vance | |
| 6,447,302 B1 | 9/2002 | Davis | |
| 6,642,628 B2 | 11/2003 | Burdick et al. | |
| 6,695,621 B1 | 2/2004 | Wang | |
| 6,733,034 B2 | 5/2004 | Tiesler | |
| 6,749,438 B1 | 6/2004 | Scheller et al. | |
| D509,474 S | 9/2005 | Bihrer | |
| D528,078 S | 9/2006 | Krieger et al. | |
| 7,118,379 B1 | 10/2006 | Wang | |
| D559,785 S | 1/2008 | Tosetti | |

(Continued)

*Primary Examiner* — Stephen F Husar
*Assistant Examiner* — James Cranson, Jr.

(57) ABSTRACT

A trailer adapter to connect a master electrical system of a towing vehicle with a subservient electrical system of a towed vehicle having a light connectable thereto is disclosed. In particular, the trailer adapter may include a body having at least one electrical interface, where the at least one electrical interface is capable of electrically engaging the electrical system of the towing vehicle. The trailer adapter may also include a light source operatively coupled to the body, where the light source is selectively changeable between at least two operative modes capable of providing illumination.

22 Claims, 10 Drawing Sheets

(56) References Cited

U.S. PATENT DOCUMENTS

| | | |
|---|---|---|
| 7,331,792 B2 | 2/2008 | Cummings et al. |
| 7,435,125 B2 | 10/2008 | Cummings et al. |
| 7,455,524 B1 | 11/2008 | Fudala et al. |
| D587,653 S | 3/2009 | Barnes et al. |
| 7,524,192 B2 | 4/2009 | Cummings et al. |
| 7,534,108 B1 | 5/2009 | Wang |
| 7,575,438 B2 | 8/2009 | Dilgard |
| D601,092 S | 9/2009 | Rupp et al. |
| 7,594,816 B1 | 9/2009 | Wang |
| D608,737 S | 1/2010 | Upham et al. |
| D617,284 S | 6/2010 | Rotenberg |
| D620,451 S | 7/2010 | Corless et al. |
| D620,452 S | 7/2010 | Corless et al. |
| D620,453 S | 7/2010 | Corless et al. |
| 7,955,085 B2 | 6/2011 | Rotenberg et al. |
| 8,258,703 B1 * | 9/2012 | Hoekstra ................ 315/77 |
| 2001/0050471 A1 | 12/2001 | McCoy et al. |
| 2002/0125771 A1 | 9/2002 | Kaminski |
| 2005/0037632 A1 * | 2/2005 | Ihde ................ 439/35 |
| 2008/0032516 A1 | 2/2008 | Cummings et al. |
| 2009/0176382 A1 | 7/2009 | Chen |
| 2009/0181555 A1 | 7/2009 | Cummings et al. |
| 2009/0302858 A1 | 12/2009 | Kulkarni et al. |
| 2012/0156896 A1 * | 6/2012 | Corless et al. ........... 439/35 |

* cited by examiner

TRAILER ADAPTER WITH LIGHT

FIELD OF INVENTION

The present invention generally relates to an electrical interface device and, more particularly, to an electrical trailer adapter device having a light.

BACKGROUND

Cars, trucks and other vehicles are frequently used to pull or tow different types of towed vehicles or trailers for various purposes. These towed vehicles or trailers may generally be provided with electrical features, such as lights, brakes, etc., that may receive power through an electrical connection with the electrical system of the towing vehicle. To that end, it may be necessary to interconnect the brake lights, turn signal indicators, running lights, and the like, of the towing vehicle with the corresponding lights on the towed vehicle or trailer.

More specifically, it may be necessary to interconnect the electrical system of the towing vehicle with that of the towed vehicle to control the corresponding electrical systems of the towing and towed vehicles. For example, when the brake lights on the towing vehicle are lit, the brake lights on the towed vehicle may be simultaneously lit. Similarly, when the turn signal on the towing vehicle is illuminated the corresponding turn signal on the towed vehicle may be illuminated. The same may apply to backup lights of the two vehicles.

In order to accomplish this, however, the electrical system of the towing vehicle must interconnect with the electrical system of the towed vehicle. Towing vehicles and towed vehicles, however, may have different electrical configuration connections, which can make it difficult to electrically attach a particular towed vehicle with a particular towing vehicle.

Typically, the wiring harness or electrical connector of each vehicle may have an array of blades, pins, slots, or receptacles. These slots or receptacle may receive pins or blades, whereas the pins or blades may be inserted into corresponding slots or receptacles. The configurations of the electrical connector of the towing vehicle may not match the electrical configuration of the towed vehicle, which may preclude the two systems from being interconnected. An electrical interface device may be used to accommodate the different types of towed vehicle electrical connectors. There are, however, limitations on the available configurations.

In addition to hooking up an applicable electrical interface device between the towing vehicle and towed vehicle, there are often other connections required, actuation of devices, or such required to operatively couple a towed vehicle with a towing vehicle and to operate a towed vehicle. It may, therefore, be beneficial to have a light source to assist with such or to otherwise have provided a light source. However, such light sources may require additional power sources, are difficult to store, or are otherwise unavailable. An additional source of light, therefore, may be needed.

Still further, it is often beneficial in towing a towed vehicle to attempt to limit the amount of items required to accomplish the hook-up and operation thereof. However, there may be limitations as to the available uses of the electrical interface device. The electrical interface devices may not be capable of providing any other functionality other than interconnecting the electrical systems of the towing vehicle and the towed vehicle.

Therefore, there is a need in the art for an improved electrical interface device, such as a trailer adapter, that may accommodate different types of towed vehicle electrical connectors, all without any modification of the trailer adapter.

Still further, there is a need for a trailer adapter that may provide an improved interface for quick and easy connections between the electrical systems of the towing vehicle and the towed vehicle while providing additional functionality, such as a light source.

SUMMARY

A trailer adapter to connect a master electrical system of a towing vehicle with a subservient electrical system of a towed vehicle having a light connectable thereto is disclosed. In particular, the trailer adapter may include a body having at least one electrical interface, where the at least one electrical interface is capable of electrically engaging the electrical system of the towing vehicle. The trailer adapter may also include a light source operatively coupled to the body, where the light source is selectively changeable between at least two operative modes capable of providing illumination.

A trailer adapter may include a body having a first electrical interface capable of operatively engaging an electrical system of a towing vehicle and a second electrical interface capable of operatively engaging an electrical system of a towed vehicle. The trailer adapter may include a light operatively coupled with the body, and where the light is operable to provide illumination when the second electrical interface is electrically engaged with the subservient electrical system and when the second electrical interface is disengaged from the subservient electrical system.

A trailer adapter capable of attaching a master electrical system of a towing vehicle with a subservient electrical system of a towed vehicle is disclosed. The trailer adapter may include a housing having a first electrical interface configured to electrically engage the master electrical system, and a second electrical interface configured to electrically engage the subservient electrical system. The trailer adapter may also include a light operatively attached to the housing, and an integrated circuit tester comprising a plurality of light-emitting diodes positioned on the second electrical interface.

DESCRIPTION OF THE DRAWINGS

The invention may be better understood by reference to the following detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
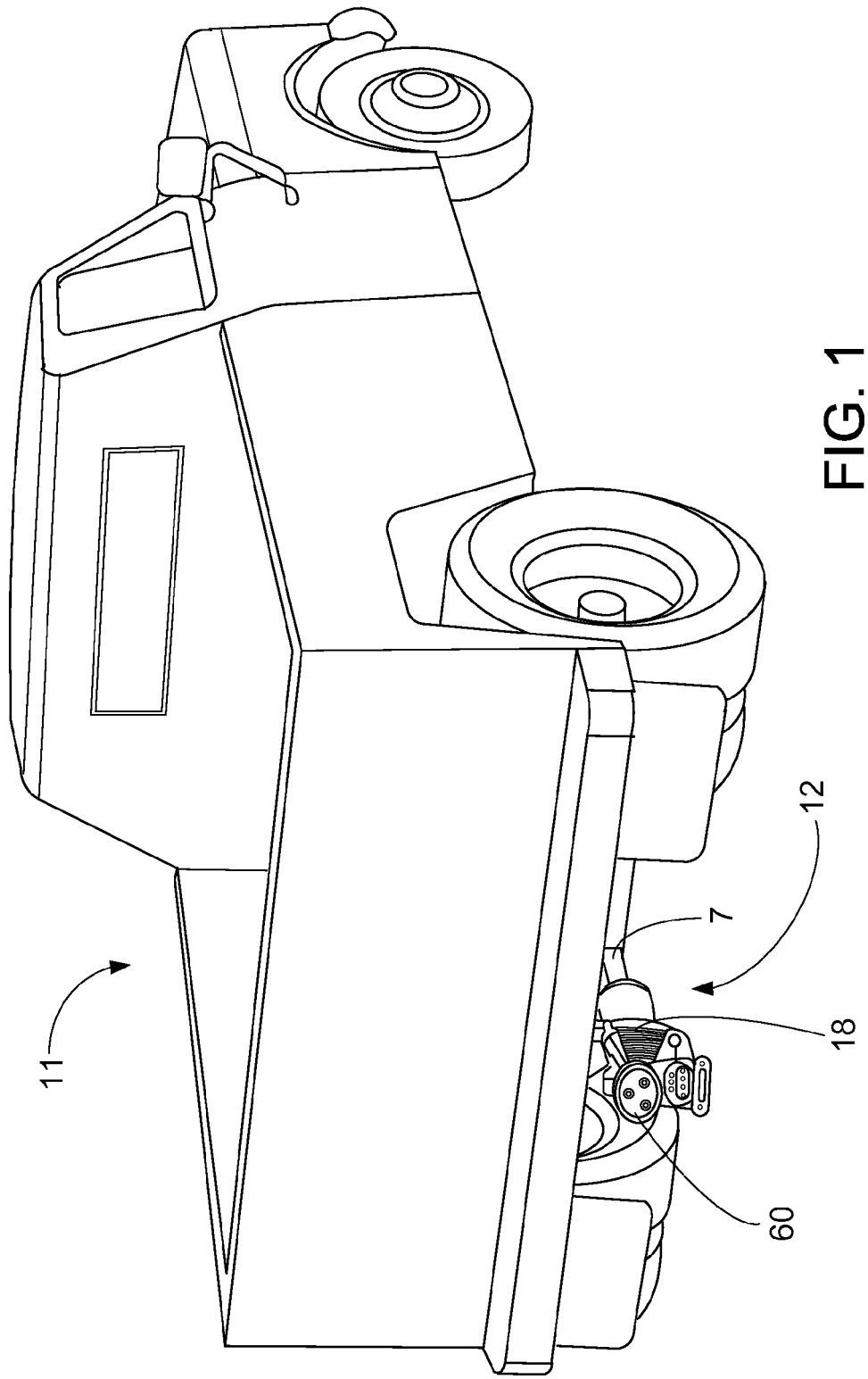
FIG. 1 is a perspective view of an embodiment of a trailer adapter with light operatively secured to a rear portion of a towing vehicle.

An exemplary trailer adapter with light 10 is illustrated in FIGS. 1-9. The trailer adapter with light 10 may be used in conjunction with a most all towing vehicles and towed vehicles/trailers, such as recreational vehicles, tractor-trailers, boat trailers, livestock trailers, cargo trailers, and any other appropriate vehicle. The trailer adapter with light 10 may be positioned at any appropriate location on the towing vehicle 11, an example of which is shown in FIG. 1, and towed vehicle or trailer (not shown). For example, the trailer adapter with light 10 may be mounted on a bumper of the towing vehicle 11, or if the towing vehicle is equipped with a hitch 12, the trailer adapter with light 10 may be mounted on the hitch 12. The trailer adapter with light 10 may be attached to the towing vehicle 11 by any appropriate means, such as with fasteners, ties, or the like. As an alternative, the trailer adapter with light 10 may be selectively attachable to the towing vehicle 11, whereby the trailer adapter with light 10 is not required to be mounted to any particular location. For example, the trailer adapter with light 10 may be capable of being mounted under the bumper, on a hitch mount, on the rear of the towing vehicle 11, or at any other appropriate location. The trailer adapter with light 10 may be attached in any appropriate manner and the present teachings are not limited to such.

The trailer adapter with light 10 may be capable of accepting any appropriate number of or variety of different connectors that may be associated with the electrical systems of different types of towing and towed vehicles, without any modification to the trailer adapter with light 10. In particular, the trailer adapter with light 10 may be used to connect a master electrical system of a towing vehicle 11 with a subservient electrical system of a towed vehicle to operate the electrical systems of the towed vehicle, while also being able to operate as an illuminating device, as described in more detail below. In many situations, the master electrical interface may not match that of the subservient electrical interface (i.e., the subservient electrical interface is different from the master electrical interface). The trailer adapter with light 10 may allow for connection of the master electrical interface with the non-matching/different subservient electrical interface while also acting as an illuminating device. In addition, the trailer adapter with light 10 may be operatively coupled with only the towing vehicle 11 while acting solely as an illuminating device.

The trailer adapter with light 10 may be of any appropriate shape and size, such as a generally circular, rectangular, ovoidal, oval, or a combination of shapes, not just that shown in the exemplary embodiments herein. The trailer adapter with light 10 may be ergonomically compact, yet of a design that accommodates the towing vehicle 11 towing a towed vehicle or trailer having a different connector. The trailer adapter with light 10 may also be constructed from any appropriate type of material.

The trailer adapter with light 10 may include a body or housing 13 having a first end 14 and a second end 16. The body 13 may be of any appropriate shape or size, such as generally circular, rectangular, ovoidal, oval or a combination of shapes. The body 13 may include gripping features 18, such as ribs, an example of which is shown in FIGS. 1-6 and 8. The rib features 18 may be located at any appropriate position on the body 13, such as adjacent the second end 16. The rib features 18 may be of any appropriate shape or size, such as a generally elongated shape. The rib features 18 may also be slightly raised above the surface of the body 13. Still further, there may be any appropriate number of rib features 18. The rib features 18 may aid the user in placing or removing the trailer adapter with light 10 from the towing vehicle 11 or trailer, by for example, making it easier to hold and grip. The rib features 18 may be of any appropriate shape and located on any appropriate position on the body 13 and are not limited to that shown and described herein.

Figure 2:
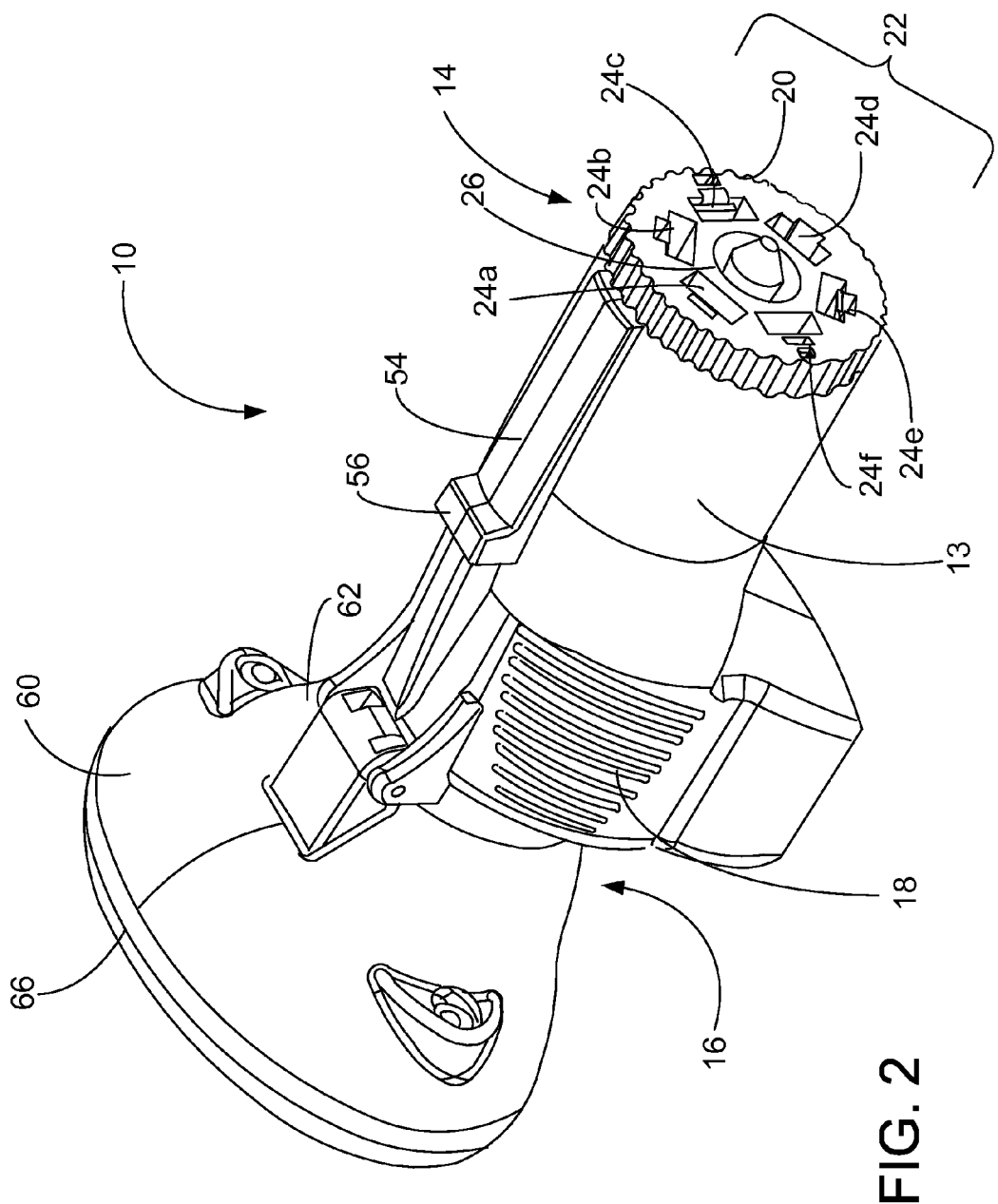
FIG. 2 is a top perspective view the trailer adapter with light.
Figure 4:
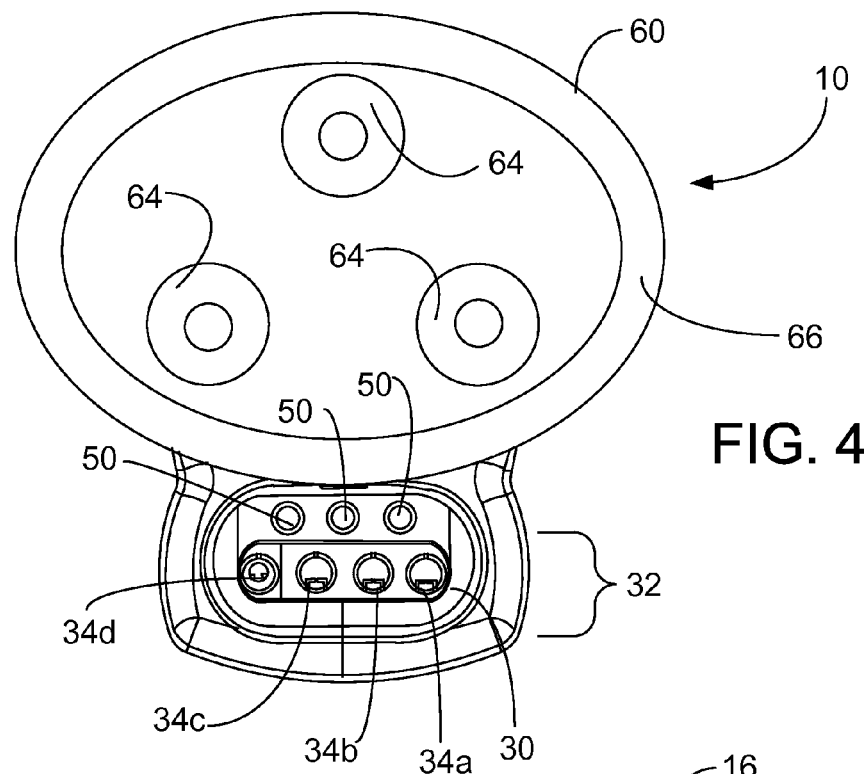
FIG. 4 is a rear view of the trailer adapter with light.
Figure 7:
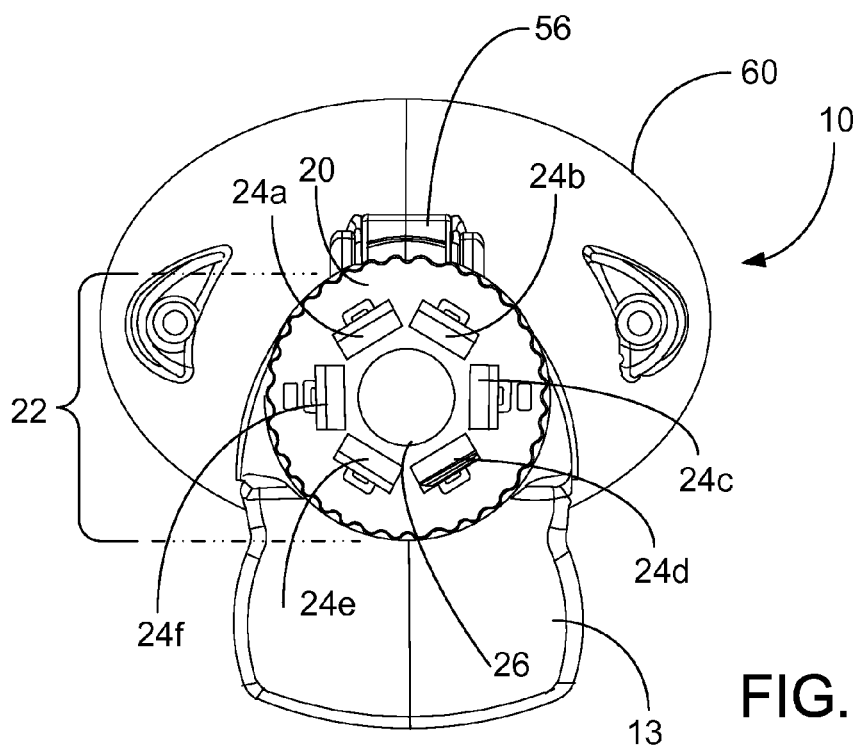
FIG. 7 is a front view of the trailer adapter with light.

In some embodiments, the trailer adapter with light 10 may include a first electrical interface 20 and a second electrical interface 30; as shown in FIGS. 2, 4 and 7. The interfaces 20 and 30, in these embodiments, may provide the trailer adapter with light 10 with the appropriate electrical connection(s) between the electrical systems of the towing vehicle 11 and towed vehicle. While the trailer adapter with light 10 may be shown and described as having two electrical interfaces 20 and 30, it is to be understood that the trailer adapter with light 10 may have any appropriate number of interfaces and should not be limited to that shown and described herein. By way of a non-limiting example, the trailer adapter with light 10 may include three, four, five or more electrical interfaces. While any number of electrical interfaces may be used, the exemplary embodiments showing two such electrical interfaces will be described.

Figure 8:
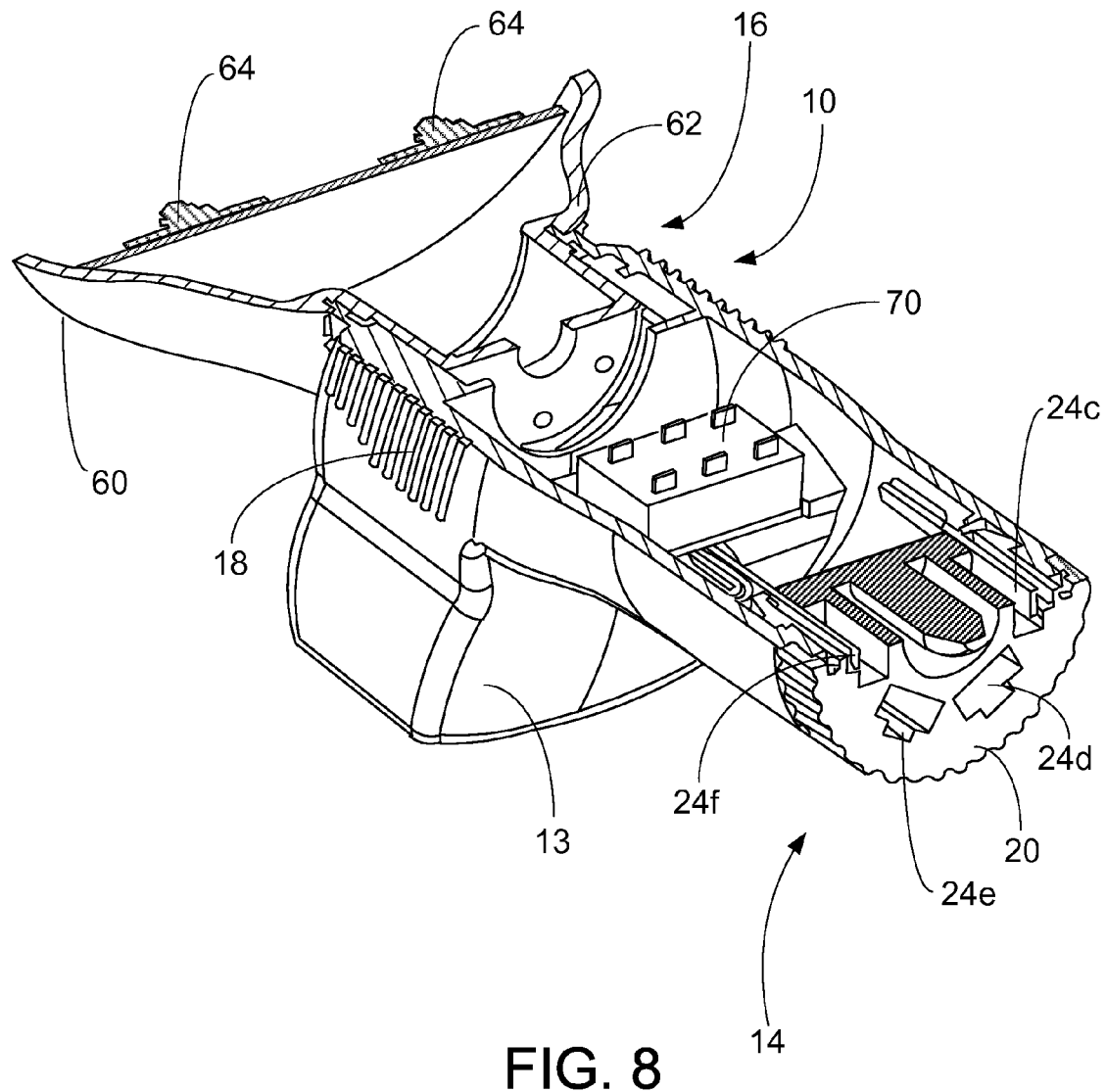
FIG. 8 is a cross-sectional view of the trailer adapter with light along line 8-8 of FIG. 3.

The first electrical interface 20 may be located at any appropriate position on the trailer adapter with light 10, such as at the first end 14, as shown in FIGS. 2, 7 and 8. The first interface 20 may be configured to be coupled to the master electrical interface of the towing vehicle 11 and may include a first set of terminals 22. The first set of terminals 22 may include at least one terminal 24; however, there may be any appropriate number of terminals 24, such as four, six, seven, etc. The terminals 24 may be of any appropriate shape, size, or type. By way of a non-limiting example, the terminals 24 may be flat or blade type terminals, pin-type terminals, etc. The terminals 24 may be in any appropriate type of arrangement or configuration, such as in a generally circular arrangement. Each terminal 24 may correspond to a certain function, such as providing a signal for controlling the tail lights, left turn signal, right turn signal, brake lights, electric brake control circuit, back-up/auxiliary, battery voltage, and the like from the corresponding master electrical system of the towing vehicle 11 to the subservient electrical system of the towed vehicle. This may result in the user of the towing vehicle 11 only having to operate the function on the towing vehicle 11 to operate the corresponding function on the towed vehicle.

More specifically, the first set of terminals 22 may be a seven-way terminal, which is shown in FIGS. 2, 7 and 8 as a blade terminal with a central pin 26, in which one terminal 24d may connect ground, a second terminal 24c may connect the left turn control, a third terminal 24f may connect the right turn control, a fourth terminal 24b may connect the tail light control, a fifth terminal 24e may connect the electric brake control circuit, a sixth terminal 24a may connect the battery/auxiliary control to the towed vehicle/light source 60, and a seventh pin terminal 26 may connect the reverse/back-up control to the towed vehicle/light source 60. It should be understood, however, that many other variations may be used without departing from the present teachings.

As shown, the seventh pin terminal 26 of the first interface 20 may be located at any appropriate position on the first interface 20, such as at the approximate center of the first interface 20. The seventh pin terminal 26 may be located at the approximate center of the terminals 24a-24f, whereby the terminals 24 may be located radially around the pin terminal 26.

The second electrical interface 30 may be located at any appropriate position on the adapter 10, such as at the second end 16 as shown in FIG. 4. The second interface 30 may include a second set of terminals 32. The second set of terminals 32 may include at least one terminal 34; however, there may be any appropriate number of terminals 34, such as two, three, five, etc. The terminals 34 may be of any appropriate shape, size, or type. For example, the terminals 34 may be generally cylindrical in shape. The terminals 34 may be in any appropriate type of arrangement or configuration, such as in a generally linear arrangement or any other appropriate configuration. Each terminal 34 may correspond to a certain function, such as providing a signal for controlling the tail lights, left turn signal, right turn signal, brake lights, brake circuit, back-up/auxiliary, battery voltage, and the like from the corresponding master electrical system of the towing vehicle 11 to the subservient electrical system of the towed vehicle. This may permit the user of the towing vehicle 11 to only have to operate the function on the towing vehicle 11 to operate the corresponding function on the towed vehicle.

By way of a non-limiting example as shown in FIG. 4, the second set of terminals 32 may be a four-way terminal in which one terminal 34d may connect ground, a second terminal 34b may connect the left turn and stop control, a second terminal 34a may connect the right turn and stop control, and a fourth terminal 34c may connect the tail light control to the towed vehicle. When the second set of terminals 32 is configured as a four-way terminal the fifth terminal 34a may be absent. It should be understood, however, that many other variations may be used without departing from the present invention.

The trailer adapter with light 10 may include at least one integrated circuit tester, such as by way of a non-limiting example a light-emitting diode (LED) 50, which is shown in FIG. 4. There may be any appropriate number of LEDs 50, such as two, three, four, etc. The integrated circuit tester with LEDs 50 may monitor the continuity of the circuits. In particular, the LEDs 50 may be continuously be illuminated if there is continuity of the circuit. This, therefore, may allow the user to determine if the trailer adapter with light 10 is installed effectively and that the connections on the trailer adapter with light 10 have not come undone or disconnected. The LEDs 50 may be of any appropriate color, such as blue, clear, red, etc., or any combination of colors.

The trailer adapter with light 10 may include an alignment member 54. The alignment member 54 may be of any appropriate shape or size, such as a generally square, rectangular, or circular shape. The alignment member 54 may be located at any appropriate position on the trailer adapter with light 10, such as along an approximate centerline of the body 13. The alignment member 54 may be slightly raised from the surface of the body 13. The alignment member 54 may aid in alignment of the trailer adapter with light 10. For example, the alignment member 54 may help with proper alignment when coupling the first end 14 with the master electrical system of the towing vehicle 11. The alignment member 54 may cooperate with a correspondingly shaped and sized key-type mechanism of the electrical system that may be provided at the towing vehicle.

The trailer adapter with light 10 may include a stop 56 shown in FIGS. 2, 3, 6 and 7. The stop 56 may be of any appropriate shape or size, such as a generally square, rectangular, or circular shape. The stop 56 may be located at any appropriate position on the trailer adapter with light 10, such as at the approximate center of the body 13. The stop 56 may be at a raised position from the surface of the body 13. The stop 56 may contact a portion of the towing vehicle 11 or trailer and thereby prevent any further movement/insertion of the trailer adapter with light 10.

Further, the trailer adapter with light 10 may include a light source 60, an example of which is shown in FIGS. 1-8. The light source 60 may be any appropriate light, such as by way of a non-limiting example, incandescent, LED, compact fluorescent, and the like. The present teachings are not limited to a specific light, but may include any appropriate type of light. As shown in FIGS. 1-8, the light source 60 may be an LED light.

The light source 60 may be operatively coupled to the body 13 of the trailer adapter with light 10 in any appropriate manner; for example, the light source 60 may be integrally formed with the trailer adapter with light 10. By way of a non-limiting example, the light source 60 may include a body 62. The body 62 of the light source 60 may be integrally formed with the body 13. Alternatively, the body 62 of the light source 60 may be attached to the body 13 in any appropriate manner, such as by way of non-limiting examples, welding, fastening, or using adhesives.

As shown in FIGS. 1 and 4, the light source 60 may include three LEDs 64. However, any number of LEDs may be utilized without departing from the present teachings, such as one, two, four, etc. The LEDs 64 may be used as the light source 60 as they generally may draw less power from the towing vehicle 11, they tend not to generate unneeded heat, and have a longer life than other light sources. The light source 60 may include a generally clear cover 66 generally allowing light to pass therethrough that may be selectively attachable to the body 62. The cover 66 being selectively attachable may allow it to be removed so as to provide access to the LEDs 64 to repair, replace, etc. In other embodiments, the cover 66 may be permanently affixed to or integrally formed with the body 64.

Figure 3:
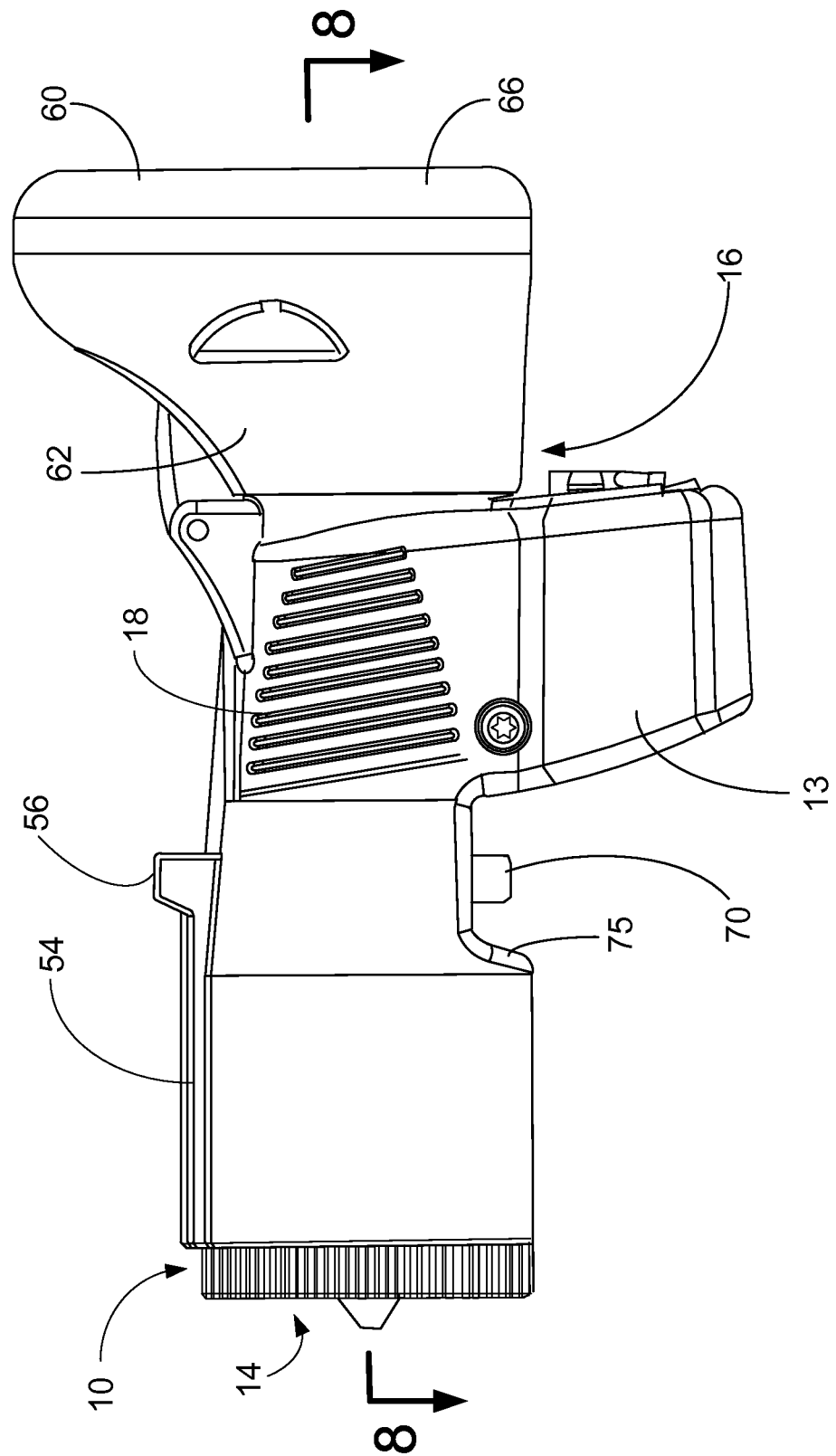
FIG. 3 is a side view of the trailer adapter with light.
Figure 5:
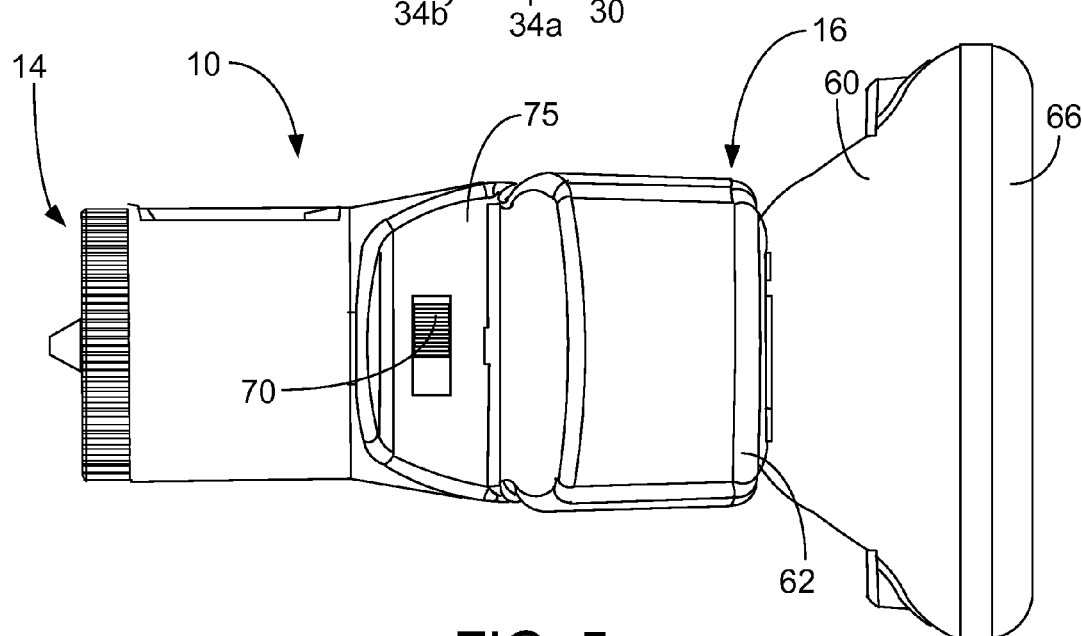
FIG. 5 is a bottom view of the trailer adapter with light.
Figure 6:
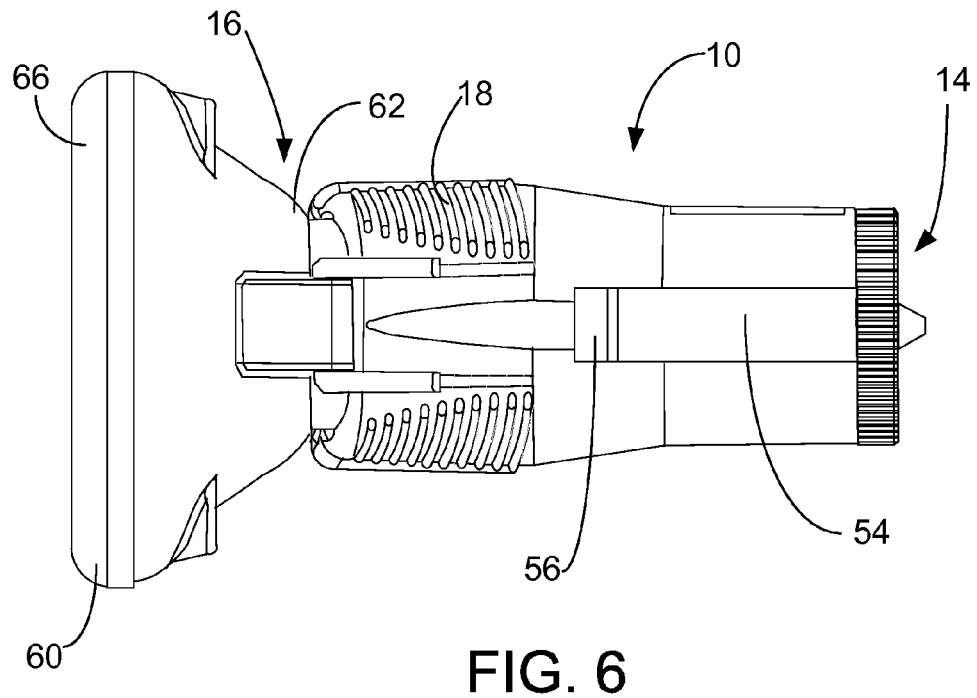
FIG. 6 is a top view of the trailer adapter with light.

The trailer adapter with light 10 may include an actuator, such as a switch 70, which is shown in FIGS. 3, 5 and 8. The switch 70 may be of any appropriate shape, size or type, such as a generally square, rectangular, or circular shape. The switch 70 may be located at any appropriate position on the trailer adapter with light 10, such as at an approximate center of the underside of the body 13. By way of a non-limiting example, the switch 70 may be positioned on the body 13 generally perpendicular to the first electrical interface 20. The switch 70, however, may be in any appropriate position and the teachings are not limited to such. The switch 70 may be positioned on the body 13 in a recess 75 of the body 13 in an effort to help prevent the switch 70 from being inadvertently manipulated between the first and second positions. The recess 75 may allow the switch 70 to be below or at the approximately same level as the body 13 adjacent the switch 70.

The switch 70 may be utilized to change the light source 60 between different modes of operation of the light source 60. In some embodiments, the operative modes of the light source 60 may include a backup operative mode and an auxiliary operative mode. In addition, the trailer adapter with light 10 may include a third mode, such as for example an off mode in which the light source 60 is not operative, i.e., it does not illuminate.

In the backup mode, trailer adapter with light 10 may illuminate the light source 60 when the towing vehicle 11 is put in reverse or the towing vehicle's electrical system otherwise detects the towing vehicle 11 being in reverse. In these embodiments, the light source 60 may be powered to illuminate utilizing the electrical system of the towing vehicle 11. The trailer adapter with light 10 being selectively positioned in the backup mode may operate so as to be illuminated when the towing vehicle 11 is in reverse with the first and second electrical interfaces 20, 30, being operatively coupled with the towing 11 and towed vehicle, respectively. In addition, the trailer adapter with light 10 being selectively positioned in the backup mode may operate so as to be illuminated when the towing vehicle 11 is in reverse with only the first electrical interface 20 being operatively coupled with the towing vehicle 11. Regardless of how the trailer adapter with light 10 is operatively secured, the backup mode illuminating the light source 60 may allow a user more light with which to reverse the towing vehicle 11.

In the auxiliary mode, trailer adapter with light 10 may generally illuminate the light source 60. The illumination in the auxiliary mode may not be conditioned on any input from the towing vehicle 11 other than the power required to illuminate, i.e., in the auxiliary mode the light source 60 may stay illuminated until the mode of operation of the trailer adapter with light 10 is changed from the auxiliary mode. In these embodiments, the light source 60 may be powered to illuminate utilizing the electrical system of the towing vehicle 11. The trailer adapter with light 10 being selectively positioned in the auxiliary mode may operate so as to be generally illuminated when the first and second electrical interfaces 20, 30, are operatively coupled with the towing 11 and towed vehicle, respectively. In addition, the trailer adapter with light 10 being selectively positioned in the auxiliary mode may operate so as to be generally illuminated when only the first electrical interface 20 being operatively coupled with the towing vehicle 11. Regardless of how the trailer adapter with light 10 is operatively secured, the auxiliary mode may be particularly useful to illuminate the area generally behind the towing vehicle 11 and/or near the front of the towed vehicle such as to manage propane tanks on the front of a towed vehicle.

In some embodiments, the trailer adapter with light 10 may be selectively operated in a third mode. The third mode may be an "off" mode such that when the trailer adapter with light 10 is in the off mode the light source 60 will not illuminate regardless of the status of the towing vehicle 11. While three modes of operation are described, the present teachings are not limited to such. Any number of different modes of operation may be utilized without departing from the present teachings.

In some embodiments, the switch 70 may be selectively positioned laterally across the body 13 to and from a first position and a second position during operation thereof. In some embodiments, during operation of the switch 70, it may be selectively positioned laterally across the body 13 to and from a first position, a second position, and a third position. The switch 70, however, may take any appropriate form and may operate through any appropriate motion, such as by way of a non-limiting example, rotating, depressing, sliding, rolling, or any other appropriate actuation.

Figure 9:
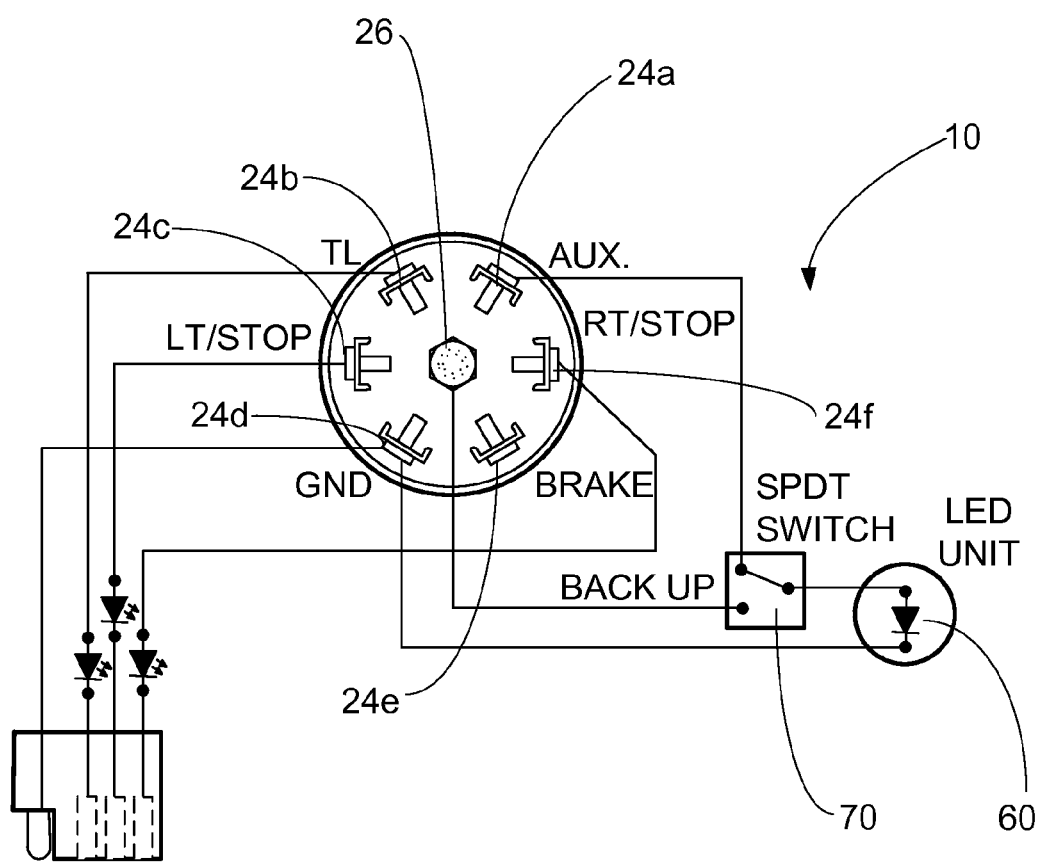
FIG. 9 is a wire diagram of an exemplary embodiment of electrical interfaces and a light of embodiments of the trailer adapter with light.

An exemplary wiring of the trailer adapter with light 10 is shown in FIG. 9. In FIG. 9, the wiring diagram depicts a seven-way to four-flat adapter. In these exemplary embodiments, one terminal 24e may connect ground, a second terminal 24f may connect the left turn control, a third terminal 24c may connect the right turn control, a fourth terminal 24a may connect the tail light control, a fifth terminal 24d may connect the electric brake control circuit, a sixth terminal 24b may connect the battery/auxiliary control to the light source 60 through the actuator 70, and a seventh pin terminal 26 that may connect the reverse/back-up control to the light source 60 through the switch 70. It should be understood, however, that many other variations may be used without departing from the present teachings.

While the trailer adapter with light 10 may have been shown and described as utilizing certain types of terminals or configurations of terminals, the trailer adapter with light 10 should not be limited to that shown and described herein. By way of a non-limiting example, the trailer adapter with light 10 may provide for a seven-way to six-way adapter, a seven-way to four-flat adapter, etc.

The trailer adapter with light 10 may be connected to the electrical system of the towing vehicle 11, whereby the trailer adapter with light 10 may be properly integrated into the master electrical system of the towing vehicle 11. When it is desired to tow a trailer, the subservient electrical system of the towed vehicle may be connected to that of the towing vehicle 11 through the trailer adapter with light 10. Connecting the electrical systems of the towing 11 and towed vehicles through the trailer adapter with light 10 may serve to electrically interconnect the electrical systems, without requiring any modification of the trailer adapter with light 10. Still further, while the trailer adapter with light 10 may be connected to the electrical systems of the towing 11 and towed vehicle, the light source 60 may still be operative in the applicable mode operation, e.g., backup and auxiliary modes. For example, when the trailer adapter with light 10 is operatively positioned in the backup mode, the light source 60 may illuminate when the towing vehicle 11 is placed in reverse. When the trailer adapter with light 10 is operatively positioned in the auxiliary mode, the light source 60 may generally illuminate. Both of these modes of operation may occur with the electrical system of the towed vehicle, or the subservient electrical system, being operatively coupled with the trailer adapter with light 10 and not being so operatively coupled.

For example, the first interface 20 may cooperate with the electrical connecter on the towing vehicle 11 so as to permit an electrical connection through the trailer adapter with light 10. The second interface 30 may cooperate with the electrical connector on the towed vehicle so as to electrically connect the towed vehicle with the subservient electrical system of the towing vehicle 11 via the trailer adapter with light 10. All this may occur while the light source 60 may still be capable of being selectively operated to illuminate in the applicable mode described above.

Additional embodiments of a trailer adapter with light according the present teachings are described below. In the descriptions, all of the details and components may not be fully described or shown. Rather, the features or components are described and, in some instances, differences with the above-described embodiments may be pointed out. Moreover, it should be appreciated that these additional embodiments may include elements or components utilized in the above-described embodiments although not shown or described. Thus, the descriptions of these additional embodiments are merely exemplary and not all-inclusive nor exclusive. Moreover, it should be appreciated that the features, components, elements and functionalities of the various embodiments may be combined or altered to achieve a desired trailer adapter with light without departing from the spirit and scope of the present teachings.

Figure 10:
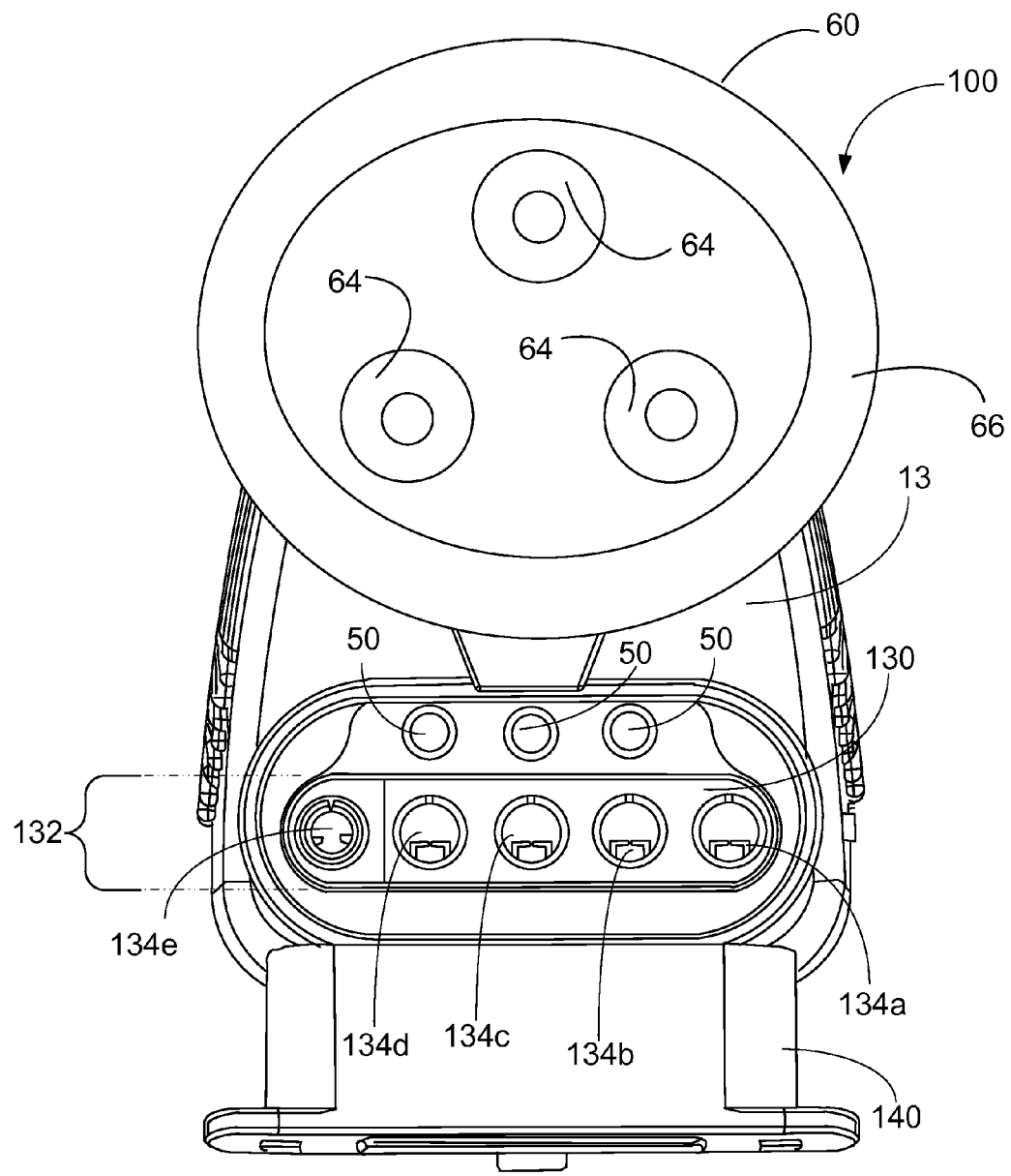
FIG. 10 is a rear view of an embodiment of a trailer adapter with light.
Figure 11:
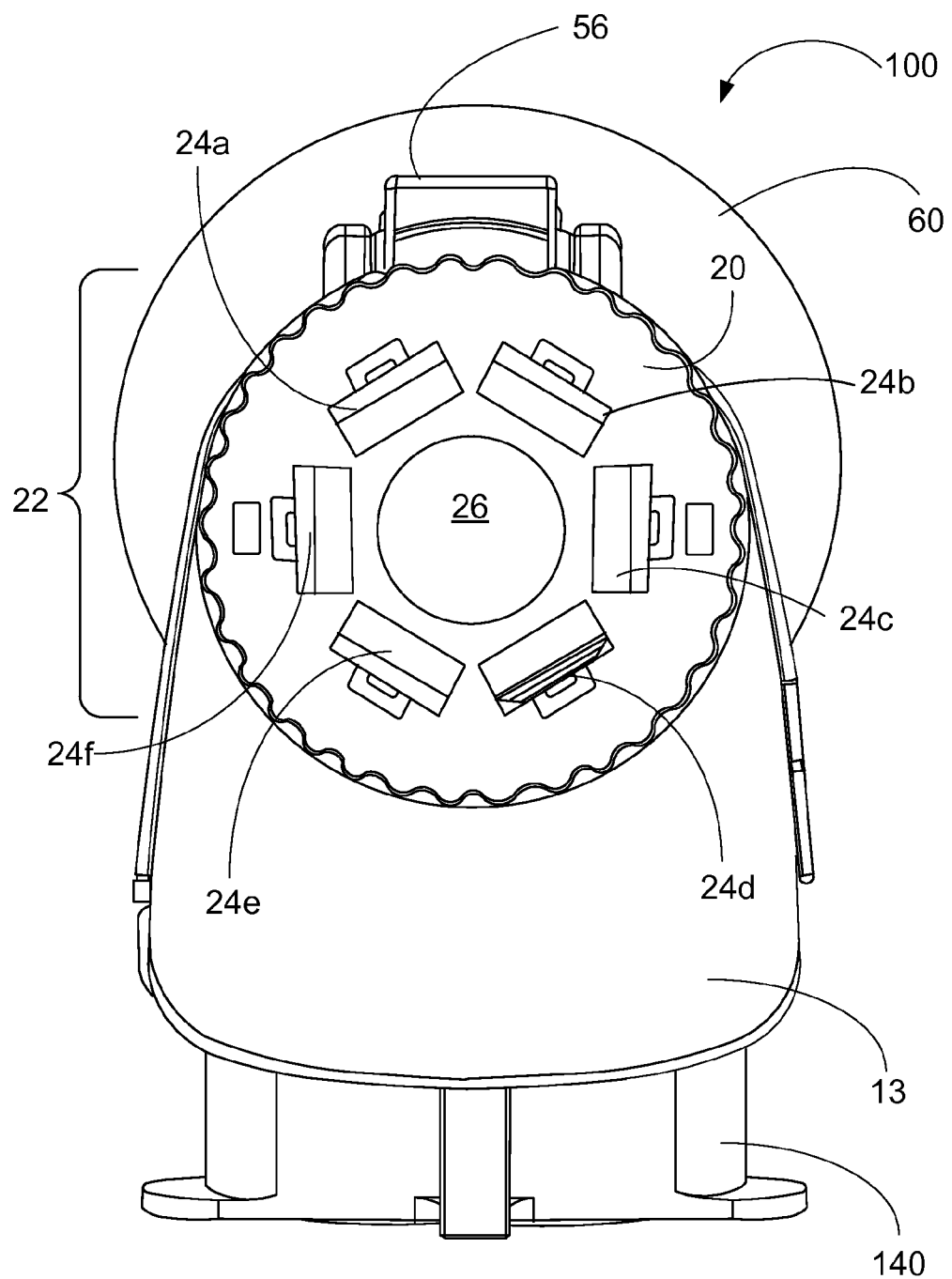
FIG. 11 is a front view of the trailer adapter with light of FIG. 10.
Figure 12:
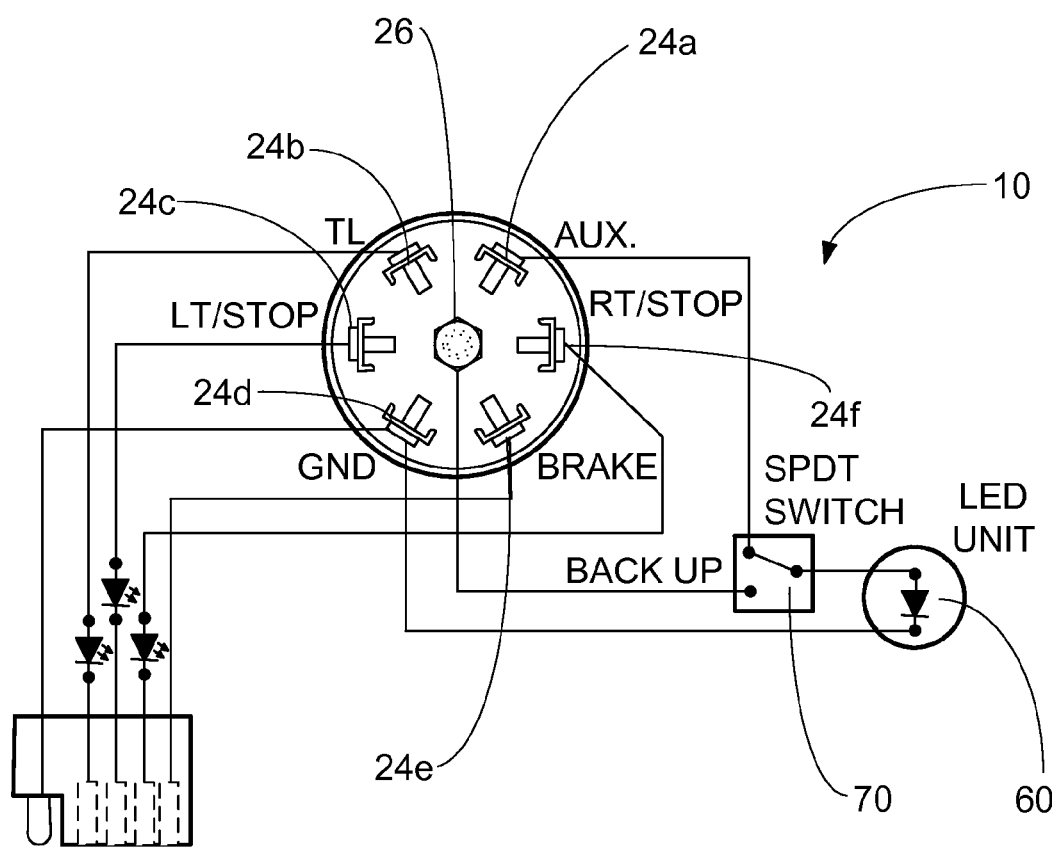
FIG. 12 is a wire diagram of an exemplary embodiment of electrical interfaces and a light of embodiments of the trailer adapter with light.

In some embodiments of a trailer adapter with light 100, such as that shown in FIGS. 10-12 the trailer adapter with light 100 may include a second electrical interface 130 that includes a five-way terminal. The second electrical interface 130 may include a second set of terminals 132 configured as a five-way terminal that are shown in FIG. 10. By way of a non-limiting example, the second set of terminals 132 may include one terminal 134e that may connect ground, a second terminal 134c that may connect the left turn and stop control, a second terminal 134b that may connect the right turn and stop control, a fourth terminal 134d that may connect the tail light control, and a fifth terminal 134a that may connect the electric brake control circuit to the towed vehicle. It should be understood, however, that many other variations may be used without departing from the present invention.

In addition, the second electrical interface 130 may optionally include a cover 140. The cover 140 may be of any appropriate shape or size, such as a generally circular, ovular or rectangular shape. The cover 140 may be correspondingly shaped and sized to fully cover or encase the second electrical interface 130 and its second set of terminals 132. The cover 140 may be attached to the body 13 by any appropriate means, such as with a tether, by a hingedly connected mechanism, or by any other appropriate means. Alternatively, the cover 140 may be completely removable from the body 13. The cover 140 may protect the second set of terminals 132 and provide weather protection to the second electrical interface 130. It should be understood, however, that the cover 140 may not be included at all.

An exemplary wiring of the trailer adapter with light 100 is shown in FIG. 12. In FIG. 12, the wiring diagram depicts a seven-way to five-flat adapter. In these exemplary embodiments, one terminal 24e may connect ground, a second terminal 24f may connect the left turn control, a third terminal 24c may connect the right turn control, a fourth terminal 24a may connect the tail light control, a fifth terminal 24d may connect the electric brake control circuit, a sixth terminal 24b may connect the battery/auxiliary control to the light source 60 through the actuator 70, and a seventh pin terminal 26 that may connect the reverse/back-up control to the light source 60 through the switch 70. It should be understood, however, that many other variations may be used without departing from the present teachings.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, we claim:

1. A trailer adapter for attaching an electrical system of a towing vehicle with an electrical system of a towed vehicle, the trailer adapter comprising:
a body having at least one electrical interface, wherein the at least one electrical interface is capable of electrically engaging the electrical system of the towing vehicle; and
a light source operatively coupled to the body, wherein the light source is selectively changeable between at least two operative modes capable of providing illumination to an area.

2. The trailer adapter of claim 1, wherein the at least two operative modes include a backup mode and an auxiliary mode.

3. The trailer adapter of claim 2, wherein the light source in the backup mode illuminates only when the electrical system of the towing vehicle indicates the towing vehicle is in reverse.

4. The trailer adapter of claim 2, wherein the light source in the auxiliary mode generally illuminates.

5. The trailer adapter of claim 1, wherein the light includes a third mode, wherein the third mode is an off mode whereby the light does not illuminate.

6. The trailer adapter of claim 1, wherein the body further comprises a second electrical interface capable of electrically engaging the electrical system of the towed vehicle, wherein the second electrical interface includes a configuration different from a configuration of the at least one electrical interface.

7. The trailer adapter of claim 6, wherein the light source is selectively changeable between the at least two operative modes providing illumination when the electrical system of the towing vehicle is operatively connected with the at least one electrical interface and the electrical system of the towed vehicle is operatively connected with the second electrical interface.

8. The trailer adapter of claim 6, wherein the second electrical interface further includes an integrated circuit tester comprising a plurality of light-emitting diodes.

9. The trailer adapter of claim 6 further comprising:
a plurality of terminals positioned on the second electrical interface; and
a cover capable of generally encasing the terminals of the second electrical interface.

10. A trailer adapter comprising:
a body having a first electrical interface capable of operatively engaging an electrical system of a towing vehicle and a second electrical interface capable of operatively engaging an electrical system of a towed vehicle;
a light operatively coupled with the body; and
wherein the light is operable to provide illumination when the second electrical interface is electrically engaged with the electrical system of the towed vehicle and when the second electrical interface is disengaged from the electrical system of the towed vehicle.

11. The trailer adapter of claim 10 further comprising an actuator positioned on the body, wherein the actuator is capable of selectively changing operation of the light between at least two operative modes capable of providing illumination.

12. The trailer adapter of claim 11, wherein the at least two modes include a backup mode and an auxiliary mode, whereby the light in the backup mode illuminates only when the towing vehicle is in reverse and the light in the auxiliary mode generally illuminates.

13. The trailer adapter of claim 10, wherein the second electrical interface further includes an integrated circuit tester comprising a plurality of light-emitting diodes.

14. The trailer adapter of claim 10, wherein the first electrical interface comprises a seven-blade interface and the second electrical interface comprises at least one of a four-pin adapter and a five-pin adapter.

15. The trailer adapter of claim 10 further comprising a cover capable of generally encasing the second electrical interface.

16. The trailer adapter of claim 10, wherein the electrical system of the towing vehicle powers the light for illumination.

17. A trailer adapter capable of attaching a master electrical system of a towing vehicle with a subservient electrical system of a towed vehicle, the trailer adapter comprising:
- a housing having a first electrical interface configured to electrically engage the master electrical system, and a second electrical interface configured to electrically engage the subservient electrical system;
- a light attached to the housing; and
- an integrated circuit tester comprising a plurality of light-emitting diodes positioned on the second electrical interface.

18. The trailer adapter of claim 17, wherein the light is selectively operable between at least two modes of operation.

19. The trailer adapter of claim 18, wherein the light is operable in the at least two modes with the second electrical interface electrically engaged with the subservient electrical system and without the second electrical interface being electrically engaged with the subservient electrical system.

20. The trailer adapter of claim 18 further comprising an actuator positioned on the housing, the actuator capable of selectively changing the light between the at least two modes of operation.

21. The trailer adapter of claim 20, wherein the actuator comprises a manually operated switch capable of selectively changing the light between at least a backup mode and an auxiliary mode.

22. The trailer adapter of claim 17, wherein the light includes a third mode, wherein the third mode is an off mode whereby the light does not illuminate.

* * * * *